United States Patent [19]
Corporandy

[11] 3,798,399
[45] Mar. 19, 1974

[54] ANTI-INCENDIARY DEVICE FOR AUTOMOTIVE VEHICLES

[76] Inventor: Joseph Corporandy, Clos Manou Bikini, 06 La Roquette Sur Siagne, France

[22] Filed: Aug. 25, 1972

[21] Appl. No.: 283,762

[30] Foreign Application Priority Data
Aug. 27, 1971 France .............................. 71.32044
June 26, 1972 France .............................. 72.24034

[52] U.S. Cl. .......................... 200/61.45 R, 200/61.5
[51] Int. Cl. .......................................... H01h 35/14
[58] Field of Search .................. 200/61.45 R, 61.53

[56] References Cited
UNITED STATES PATENTS
| | | | |
|---|---|---|---|
| 2,254,294 | 9/1941 | Kimmell ...................... | 200/61.45 R |
| 2,056,494 | 10/1936 | Tucker, Jr. et al. ......... | 200/61.45 R |
| 3,022,392 | 2/1962 | Clemson ........................... | 200/61.5 |
| 2,291,236 | 7/1942 | Kilgour .......................... | 200/61.5 X |
| 3,518,385 | 6/1970 | Boudes et al. ............... | 200/61.45 R |
| 3,560,681 | 2/1971 | Webber ....................... | 200/61.45 R |

FOREIGN PATENTS OR APPLICATIONS
779,272    7/1957    Great Britain .............. 200/61.45 R Primary Examiner—James R. Scott
Attorney, Agent, or Firm—Young & Thompson

[57] ABSTRACT

An anti-incendiary device for preventing fires upon the collision of an automotive vehicle having an internal combustion engine with an ignition system, comprises a ball held between two vertical coaxial plastic pistons that are spring urged toward the ball. Upon collision, the inertia of the ball dislodges the ball from between the pistons and permits the pistons to move toward each other. One of the pistons carries an electrically conductive cross piece that forms a portion of the circuit between the battery and the ignition system of the engine when the ball separates the pistons, but which moves into a position to interrupt the ignition circuit and ground the ignition system when its associated piston moves toward the other piston. When dislodged, the ball rests on a conical seat and the lower of the two pistons may be withdrawn against the action of its spring to permit the ball to roll back to operative position for resetting.

6 Claims, 3 Drawing Figures

PATENTED MAR 19 1974 3,798,399

ANTI-INCENDIARY DEVICE FOR AUTOMOTIVE VEHICLES

The present invention relates to anti-incendiary devices for automotive vehicles, more particularly of the type for interrupting the ignition circuit of the automotive vehicle upon collision so as to prevent the ignition system or other electrical apparatus of the vehicle from igniting spilled fuel.

More particularly, the present invention utilizes the known principle that a mass which is elastically maintained in a certain position on an automotive vehicle, will upon collision of the vehicle with another vehicle or with any other obstacle, be displaced from its normal position. This displacement, as is known, can be used for anti-incendiary purposes.

Accordingly, it is an object of the present invention to provide an anti-incendiary device of this type, which is operative in all directions from which the shock may come.

Another object of the present invention is the provision of such a device, which not only interrupts the circuit to the ignition system upon collision, but also grounds the ignition system.

Still another object of the present invention is the provision of such a device which can be readily reset.

Finally, it is an object of the present invention to provide such a device, which will be relatively simple and inexpensive to manufacture, easy to install, maintain and repair, and rugged and durable in use.

Briefly, the objects of the present invention are achieved by providing an anti-incendiary device for automotive vehicles having internal combustion engines, in which a mass comprising a ball is held between two pistons spring-urged toward each other, the pistons being vertical and coaxial. One of the pistons carries an electrical conductor which forms a bridge between contacts leading to the battery and to the ignition system in its normal position, and which forms a bridge between contacts leading to the ignition system and to ground in its other position when the ball is dislodged from between the pistons. The spring that urges the piston that carries the bridge is weaker than the spring that urges the other piston, so that the stronger spring maintains the connector normally bridging the contacts to the battery and ignition system. When the ball is dislodged from between the pistons, it rests on an upwardly concave surface through whose lowermost portion the lower piston projects. Means are provided for manually depressing this lowermost position so that the ball can roll by gravity back onto the lower piston for resetting the device by permitting the lower piston to rise while carrying the ball, the ball then contacting and pressing upward the upper piston, the bridge carried by one of the pistons being thus returned to bridging position between the contacts to the battery and ignition system.

Other features, objects and advantages of the present invention will become apparent from a consideration of the following description, taken in connection with the accompanying drawings, in which.

Figure 1:
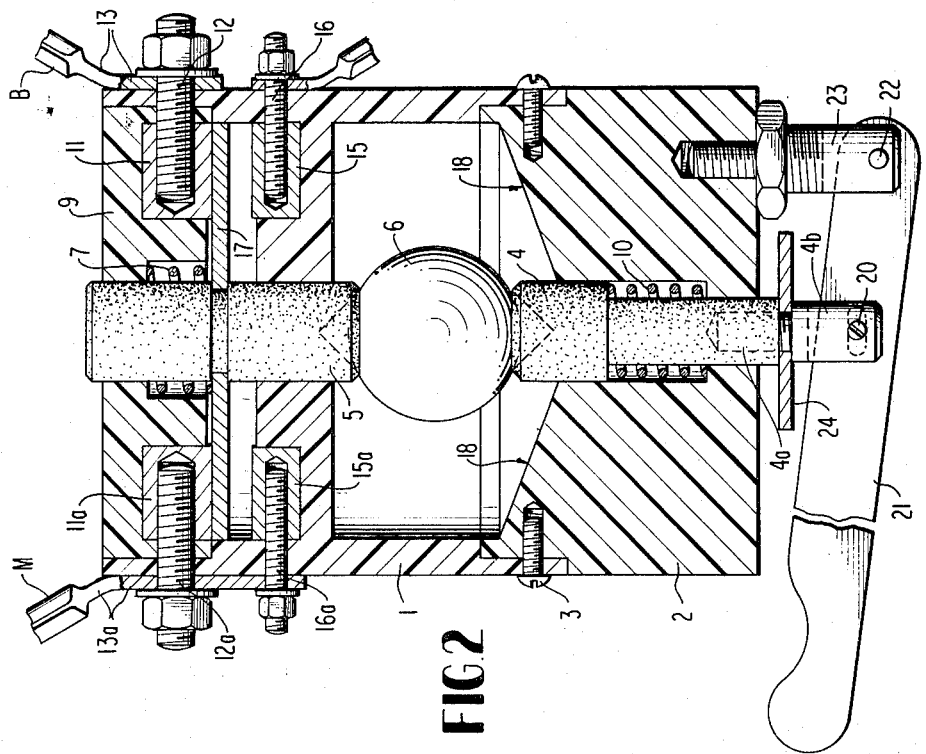
FIG. 1 is an axial cross sectional view of an anti-incendiary device for automotive vehicles, according to the present invention.

Referring now to the drawings in greater detail, and first to the embodiment of FIG. 1, there is shown apparatus according to the present invention, comprising a body formed of insulating material such as hard plastic or the like, in two portions 1 and 2 interconnected by screws 3. A vertical piston 4 is vertically slidable in portion 2 and a coaxial piston 5 is slidable coaxially in portion 1, the pistons 4 and 5 being of hard plastic or other electrically insulating material. A steel ball 6 is disposed in opposed recesses in the adjacent ends of pistons 4 and 5 and is retained therebetween in the FIG. 1 position by springs 10 and 7 that urge pistons 4 and 5, respectively, toward each other. The compression of spring 7, and hence the force with which spring 7 urges piston 5 downwardly as seen in FIG. 1, may be adjusted by a screw threaded plug 8 against which spring 7 acts and which has screw threaded engagement with the cover 9 of the device. Spring 10 surrounds a reduced diameter portion 4a of piston 4 and acts between the associated abutment shoulder on piston 4 and a screw threaded plug 20 that screwthreadedly engages the end portion 2. Plug 20, like plug 8, may be rotated to adjust the compression and hence the force with which spring 10 urges piston 4 upwardly as seen in FIG. 1.

Recessed in cover 9 is a brass contact 11 in electrically conductive relationship with the terminal 12 that leads to the connector 13 to the battery B (not shown) of the automotive vehicle. Diametrically opposed to contact 11 with respect to cover 9 is a brass contact 11a which is in electrically conductive relationship with a terminal 12a that leads to the conductor 13a to the ignition system M (not shown) of the motor vehicle.

Portion 1 of the body of the device also has a transverse partition 14 through which piston 5 slides and which is spaced below cover 9. Partition 14 has recessed therein a brass contact 15 in electrically conductive relationship with a terminal 16 that leads to ground or other anti-incendiary electrical connection. Diametrically opposed on partition 14 is a brass contact 15a in electrical connection with a terminal 16a that is also in electrically conductive relationship with the conductor 13a to the ignition system.

Figure 3:
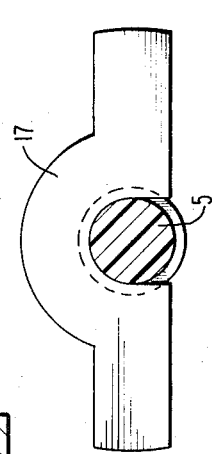
FIG. 3 is a view in a plane taken perpendicular to the axis of the device, showing the electrically conductive bridge and its associated piston.

Piston 5 has an annular recess formed intermediate its length, in which is force fitted a brass bridge 17, best seen in FIG. 3, which, in the normal or FIG. 1 position bridges across and electrically interconnects the contacts 11 and 11a thereby to maintain the battery and ignition system in circuit with each other. Ball 6 maintains piston 5 in the raised position of FIG. 1 because spring 10 is stronger than spring 7, the difference in the action of springs 10 and 7 maintaining bridge 17 against contacts 11 and 11a. Bridge 17 thus forms an abutment against which spring 7 acts.

But when ball 6 is dislodged from between pistons 4 and 5, and assumes for example the dotted line position shown in FIG. 1, then piston 4 is free to move up and piston 5 is free to move down. The downward movement of piston 5 under the influence of spring 7 urges bridge 17 into bridging contact across contacts 15 and 15a, so that the circuit to the battery is interrupted and the ignition system is grounded. In this latter position of the parts, even should the engine continue to turn by its inertia, there would be no sparking and hence no fire hazard.

To reset the device, it is necessary to draw the piston 4 downwardly. Piston 4 is surrounded by an upwardly concave surface 18, which is conical in the illustrated embodiment; and when the upper end of piston 4 is drawn down to the lower apex of the conical surface 18, then ball 6 is free to roll down surface 18 and back onto the recess at the upper end of piston 4. To facilitate drawing piston 4 downwardly, the lower end of piston 4 is provided with a fingerpiece 19. When the ball has resumed its seat on piston 4, then piston 4 can be allowed gently to rise until ball 6 seats in the recess in the lower end of piston 5, after which further release of the piston 4 under the influence of spring 10 compresses spring 7 and returns the parts to the FIG. 1 position.

Figure 2:
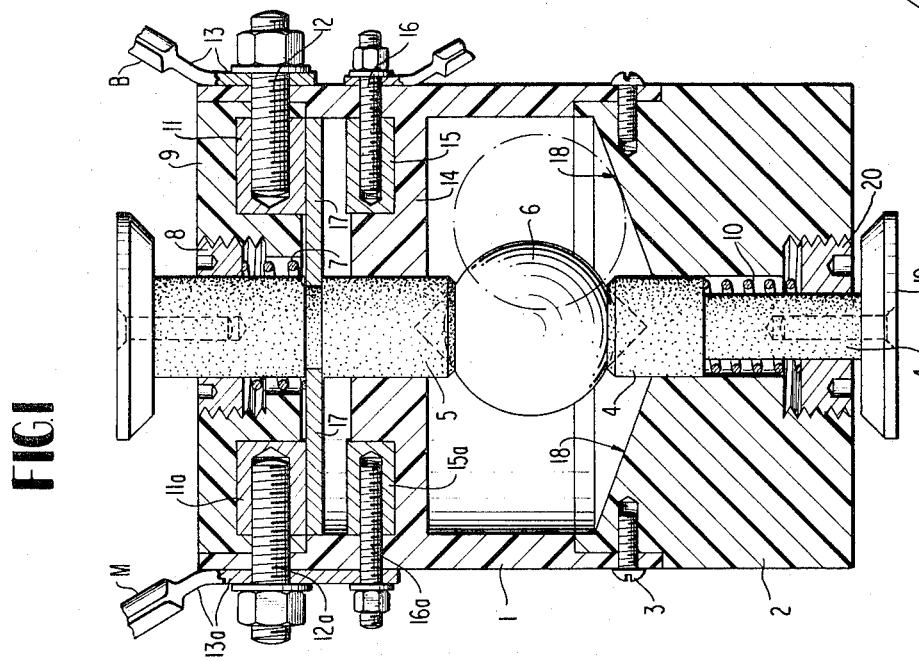
FIG. 2 is a view similar to FIG. 1 but showing a modified form of the invention.

It will of course be understood that the force with which the pistons 4 and 5 retain the ball 6 between them, is adjustable by manipulation of the plugs 8 and 20 and of course also by the choice of the mass of ball 6, thereby to predetermine the deceleration which will dislodge ball 6. A less sensitively adjustable, but also less expensive, construction is shown in FIG. 2, in which the regulatory plugs 18 and 20 are omitted. In the FIG. 2 construction, in place of the fingerpiece 19, the piston 4 is provided with a forked end 4b which is connected to a pin 20 carried by a lever 21 which at one end is pivotally connected at 22 in the forked head of a stud 23 screw threadedly connected to the lower portion 2 of the body of the device. A ring 24 carried by piston 4 limits the upward movement of piston 4 when ball 6 is off its seat.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. An anti-incendiary device for an automotive vehicle having an internal combustion engine having an ignition system normally in circuit with a battery, comprising a casing of electrically insulating material, a pair of coaxial pistons both slidable in said casing on opposite sides of a compartment in said casing, spring means urging both pistons toward each other, a mass normally maintained between said pistons in said compartment but displaceable by inertia upon collision of the vehicle, and electrically conductive means carried by one of said pistons in circuit between the ignition system and the battery through contacts carried by and electrically insulated from each other by said housing when the said mass is located between the pistons and out of contact with said contacts and interrupting said circuit when the mass is ejected from between the pistons and the pistons approach each other under the influence of said spring means.

2. A device as claimed in claim 1, said mass being a metal ball, said pistons being of electrically insulating material.

3. A device as claimed in claim 1, said spring means being two springs one associated with each of said pistons, the spring associated with the piston carrying said conductor means being weaker than the spring associated with the other piston whereby said spring associated with said other piston maintains said conductor means in electrical circuit between said ignition means and said battery.

4. Apparatus as claimed in claim 1, and contact means into contact with which said conductor means moves when said mass is displaced from between said pistons to ground the ignition system.

5. A device as claimed in claim 1, said mass being a ball.

6. A device as claimed in claim 1, and means to adjust the force of said spring means.

* * * * *